Figure 1:
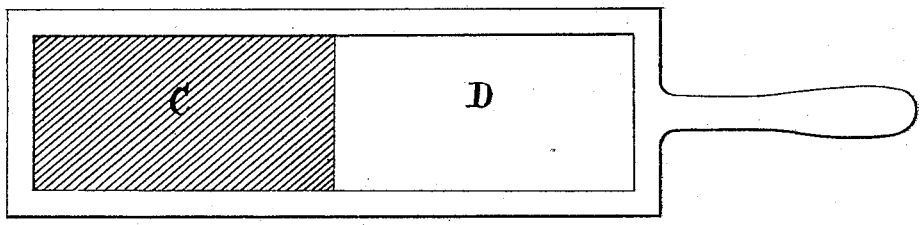

A. DAVID.
STEREOSCOPE.

No. 174,206.  Patented Feb. 29, 1876.

Witnesses  Inventor
George Smith  André David
William Herbert Maxwell  per W. R. Gedge
 Atty.

N. PETERS, PHOTO-LITHOGRAPHER, WASHINGTON, D. C.

UNITED STATES PATENT OFFICE.

ANDRÉ DAVID, OF ST. ETIENNE, FRANCE.

IMPROVEMENT IN STEREOSCOPES.

Specification forming part of Letters Patent No. 174,206, dated February 29, 1876; application filed May 18, 1874.

*To all whom it may concern:*

Be it known that I, ANDRÉ DAVID, of St. Etienne, in the Department of the Loire, Republic of France, have invented a process of obtaining, in virtual effects or motions, the animation of drawn figures by the aid of two images combined, in order to represent the two extreme positions of a motion appearing and disappearing in turn before the eyes, of which the following is a specification:

The principle on which this discovery claims to be patented rests on the possibility of observing virtual life-like motions or shiftings of images or plates by means of two images placed above each other in the drawing and combined in their shape and color, which, appearing and disappearing in turn, produce the false appearance of motion, either of persons or of objects of some kind or other.

I obtain this result by combining the shape of the two images, so that one of them represents the position of the starting-point of the motion which is intended to be produced, and the other the end of that motion. Those two images are united, one on the top of the other, in the same plate, according to the Figures 2, 3, 4 of the plan—one, A A' A'', colored red, the other, B B' B'', green.

In order to cause one of these two images to be seen and the other to be invisible, and vice versa, we make use of the screen represented by Fig. 1, containing two glass transparent plates, one, C, colored red, the other, D, green—that is, each of them of the same color as the one used to trace one of the two images.

Figure 2:
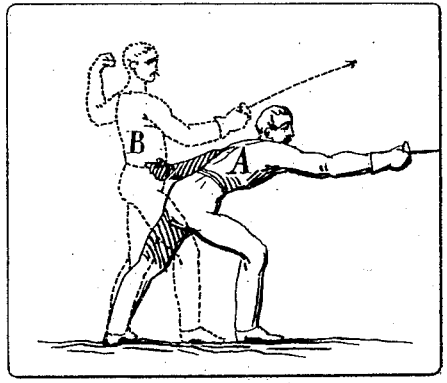
Figure 3:
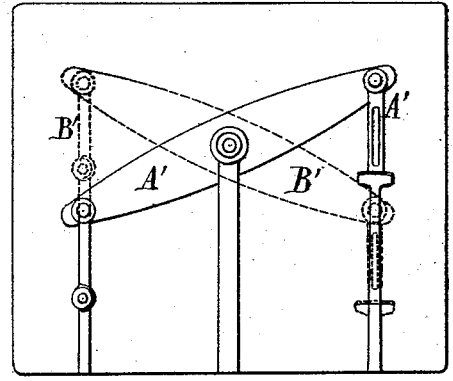
Figure 4:
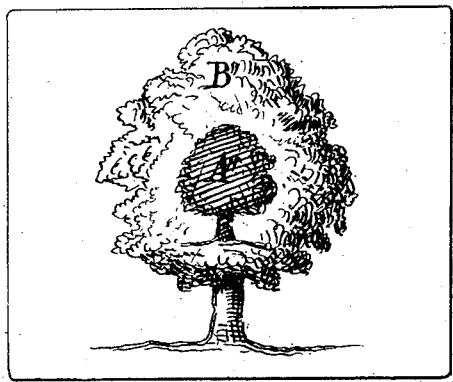

By moving, in timed motion, those transparent scenes before the plate, so that the latter is seen sometimes through the red glass, sometimes through the green, we shall perceive in the Figs. 2, 3, 4 of the plan, (which we give as illustrations,) either, Fig. 2, a fencer lunging and then parrying, and vice versa; Fig. 3, a beam accomplishing its swinging motion; or, Fig. 4, a receding and approaching motion, or one magnifying and decreasing—in short, the motion of anything which we might wish to draw according to that principle.

This false appearance of animation is explained, first, by the alternate hiding of the red image when we look at the plate through the red screen, the green image alone being visible, and the disappearance of the green image and the reappearance of the red one when looking through the green screen. Those disappearances and reappearances rest on the principle of colored transparent screens allowing only rays of their own color to pass. Second, the disappearance and reappearance succeeding each other in a very short time, one of the images appears while the impression of the other, after its disappearance, still remains on the retina—hence virtual motion and the unreal impression of animation.

It is evident that the observer may, at his will, move more or less rapidly the colored screens before the plates he wants to look at, and thus obtain, instead of the unreal appearance of animation properly so called, (obtained only by means of a certain rapidity in the regulated movement of the screen,) a change in appearance which would allow him, for example, to see instantaneously a metamorphosis, very useful in anatomical, mechanical, or horticultural plates. In that case the animation always continues, since there is substitution and immediate change in the appearance; but then the observer, instead of looking for the seeming motion, would only look for the result of the motion by observing its beginning and its end.

This discovery allows me to produce anatomical, mechanical, and horticultural plates drawn according to the principle indicated above, and to be looked at through colored transparent screens. Those plates will be found of great use in the study of those sciences, and it is that which, more than anything else, distinguishes this invention.

I claim as my invention—

The plates P, with the differently-colored figures drawn thereon, in combination with a movable frame, S, provided with the complementary colored-glass transparent plates C D, by the motion of which virtual motions of the images are obtained.

ANDRÉ DAVID.

Witnesses:
 EDMOND DELORME,
 MICHAEL COUDEYRAC.